US006767210B2

(12) United States Patent
Joffe

(10) Patent No.: US 6,767,210 B2
(45) Date of Patent: Jul. 27, 2004

(54) METHOD OF TEACHING FINANCIAL MANAGEMENT

(76) Inventor: Neville Joffe, 30 Abraham Avenue, Thornhill, Ontario, L3T 5G6 (CA)

(*) Notice: Subject to any disclaimer, the term of this patent is extended or adjusted under 35 U.S.C. 154(b) by 0 days.

(21) Appl. No.: 10/024,001

(22) Filed: Dec. 21, 2001

(65) Prior Publication Data

US 2002/0164561 A1 Nov. 7, 2002

Related U.S. Application Data

(63) Continuation of application No. 09/434,309, filed on Nov. 5, 1999, now abandoned.

(51) Int. Cl.[7] .............................................. G09B 19/18
(52) U.S. Cl. ...................................... 434/107; 273/278
(58) Field of Search ............................... 434/107, 108, 434/109, 110; 273/243, 256, 278

(56) References Cited

U.S. PATENT DOCUMENTS

| 2,230,699 A | 2/1941 | Schulze ...................... 273/148 |
| 2,297,011 A | 9/1942 | Mooney ......................... 35/24 |
| 2,297,012 A | 9/1942 | Mooney ......................... 35/24 |
| 4,142,305 A | 3/1979 | Zegel ............................ 35/24 |
| 4,179,128 A | 12/1979 | Zelazny ...................... 273/243 |
| 4,336,019 A | 6/1982 | Schroeder .................. 434/109 |
| 4,363,628 A | 12/1982 | Kirkpatrick et al. ........ 434/107 |
| 4,386,778 A | 6/1983 | Hall ............................ 273/256 |
| 4,431,195 A | 2/1984 | Brand et al. ................. 273/256 |
| 4,501,425 A | 2/1985 | Alvarado .................... 273/256 |
| 4,522,407 A | 6/1985 | Hatherley ................... 273/256 |
| 4,538,816 A | 9/1985 | Figueroa .................... 273/256 |
| 4,752,227 A | 6/1988 | Yamin ........................ 434/110 |
| 4,840,382 A | 6/1989 | Rubin ......................... 273/237 |
| 4,955,616 A | 9/1990 | Ingalls ........................ 273/249 |
| 5,056,792 A | 10/1991 | Helweg-Larsen et al. ... 273/278 |
| 5,071,135 A | 12/1991 | Campbell ................... 273/256 |
| 5,139,269 A | 8/1992 | Peterson ..................... 273/256 |
| 5,318,447 A | 6/1994 | Mooney ..................... 434/128 |
| 5,826,878 A | 10/1998 | Kiyosaki et al. ............ 273/256 |
| 5,829,747 A | 11/1998 | Nebel .......................... 273/256 |
| 6,106,300 A * | 8/2000 | Kiyosaki et al. ............ 434/107 |
| 6,375,466 B1 * | 4/2002 | Juranovic .................... 434/107 |

FOREIGN PATENT DOCUMENTS

FR          2456-534          1/1981

OTHER PUBLICATIONS

Web–TRECS: The Design and Use of an E–commerce Business Simulation: Craig M. Parker, Paula M.C. Swatman –Jun. 7–9, 1999.
Open–Book Management Fun Ways to Learn About the P & L: HR Magazing –Feb. 1996.
The General Insurance Market Instructional Computer Simulation: Lawrence & MacDonald –Dec. 3–7, 1995 (ASCILITE95 Conference Melbourne).

* cited by examiner

*Primary Examiner*—Kurt Fernstrom
(74) *Attorney, Agent, or Firm*—Vidas, Arrett & Steinkraus PA

(57) ABSTRACT

A method of teaching financial management of an enterprise, comprising: providing objects representing a balance sheet and income statement, also providing a source of monetary markers, the source representing the general economy, selecting an instruction to illustrate a financial transaction, directing the movement of the monetary markers among the objects to represent the selected instruction, and representing, by the distribution of the monetary markers among the objects, a financial condition of the enterprise.

15 Claims, 11 Drawing Sheets

Assets | Liab. | Revenues | Exp.
- Cash $60,000
- Eqpt. $60,000
- Inventory $40,000
- Loan $40,000
- Owner's Eq. $60,000

Figure 7b

Assets | Liab. | Revenues | Exp.
- Cash $30,500
- Eqpt. $57,500
- Inventory $10,000
- Loan $38,000
- Owner's Eq. $60,000
- Revenues $60,000
- Cost of Goods Sold $30,000
- Depreciation $2,500
- Expenses $27,500

Figure 7c

Assets | Liab. | Revenues | Exp.
- Cash $30,500
- Eqpt. $57,500
- Inventory $10,000
- Loan $38,000
- Owner's Eq. $60,000
- ($0 Profit)

Assets | Liab. | Revenues | Exp.
- Cash $5,500
- Accts. Rec. $75,000
- Equipment $52,500
- Inventory $20,000
- Loan $34,000
- Accts. Payable $50,000
- Owner's Eq. $54,000
- Revenues $75,000
- Cost of Goods Sold $30,000
- Depreciation $2,500
- Expenses $27,500

Figure 9b

Assets | Liab. | Revenues | Exp.
- Cash $5,500
- Accts. Rec. $75,000
- Equipment $52,500
- Inventory $20,000
- Loan $34,000
- Accts. Payable $50,000
- Owner's Eq. $69,000

←($15,000 Profit)

METHOD OF TEACHING FINANCIAL MANAGEMENT

CROSS-REFERENCE TO RELATED APPLICATIONS

The present application is a continuation of U.S. patent application Ser. No. 09/434,309, filed Nov. 5, 1999 now abandoned.

FIELD OF THE INVENTION

This invention relates generally to the field of education, and more particularly to a method of teaching financial management and accounting principles.

BACKGROUND OF THE INVENTION

In the modern economy, the principles of accounting play an integral role in the management of every type of financial enterprise. This includes private businesses, as well as non-profit, public, and government organizations. Accordingly, the managers of the various enterprises need to have a good understanding of these accounting principles and their related bookkeeping concepts. Moreover, it is important that their understanding not be limited to knowledge of just the dry mechanics of the topic, for example, the technical terms "debits", "credits", "balance sheets" etc. Rather, it should also include a natural and intuitive understanding of the meaning behind the concepts. In this way, the various accounting terms could be meaningfully related to fundamental day-to-day management concerns, such as cash flow and profits, for example. This would allow for better managment decisions.

What is often overlooked is that it is also beneficial for lower-level employees to acquire a similar understanding of accounting principles and concepts. For example, the sales staff in many organizations have a tendency to discount the price of product to generate increased sales volume. What is often not realized is that this practice can have an adverse effect on the organization's profitability, particularly where there is only a moderate or marginal increase in sales volume. Alternatively, sales may be boosted by granting overly liberal credit terms. This could be profitable, but leave the company drastically short of cash and unable to meet its current liabilities. However, if the sales staff were to acquire a solid and intuitive understanding of basic accounting principles, they may be less likely to engage in these counterproductive tactics and more likely to pursue productive ones. For example, they might be more inclined to generate sales by promoting the product's benefits rather than a low price, and might be more judicious in granting of credit.

Another example is that employees may be dissatisfied with their level of pay or size of their annual bonus. This can lead to a corrosive atmosphere, particularly where there are a large group of such employees, for example, production workers in a large manufacturing operation. The employees may feel that the organization has the means to pay more, but is unfairly suppressing their compensation. This perception however may be inaccurate, as the employer may in fact be only marginally profitable, notwithstanding the large sums that pass through the organization. Again, training the employees in basic accounting principles and concepts may provide them with the insight to understand the reality of the situation. Further, it may prompt some consideration of measures that could be taken to improve profitability, and thereby provide a basis to support a genuine increase in income.

Thus, having a common understanding of accounting principles among all members of an organization leads to better communication, a smoother running organization, and an improved ability to work together to achieve enhanced benefits for all.

In practice, while there are many books and courses on the subject, the principles of accounting and basic business concepts are still not well or widely understood. The problem is that a good understanding of how money flows in and out of a business requires an appreciation of the interrelationship between different accounts and bookkeeping entries. These are technical, abstract concepts which can be difficult to convey using books or traditional lecture methods, which generally require the student to keep a number of abstract concepts, functions, and sums organized in his or her head.

As a result, accounting knowledge tends to be concentrated among those who have dedicated extensive study time to the topic, such as for example, financial executives. Managers of other areas of an enterprise, lower-level employees, and entrepreneurs may therefore lack the conceptual understanding of accounting principles that would optimize their contribution. Further, given the limited time available to busy working people, it is unlikely that any but a small number of these people will find the time to acquire such knowledge using current methods.

There have been some attempts in the prior art to improve upon the traditional teaching methods of accounting by using a game-like structure. For example, Zegel, U.S. Pat. No. 4,142,305, teaches a game board divided into sections corresponding to those that appear on a balance sheet, i.e. "assets", "liabilities", "capital", and "profit". The user places triangular-shaped pieces, oriented up or down to represent increases or decreases in value, on the board, to confirm the accounting equation "assets=claims". This simulates entry of transactions in a journal. Subsequently the pieces are transferred to various account cards off the board, to simulate posting entries to T-accounts.

The Zegel patent teaches a structure that may assist in the teaching of rudimentary bookkeeping concepts, specifically the concept of debits and credits, journal entries, posting, and balancing of accounts. This may be useful in training a bookkeeper. However, it fails to provide a useful overview of accounting principles, specifically the core accounting documents of a balance sheet and income statement, and how they relate to real-life business decisions. The physical layout can be distracting as well, since it involves having a disparate number of account cards that are strewn about the main game board.

Another patent is U.S. Pat. No. 4,336,019 to Schroeder. This teaches an unmarked game board divided into columns intended to correspond to the balance sheet concepts of assets, liabilities, and owners equity. Cardboard pieces are marked with the name of an account and a numerical amount, and are placed in the appropriate column. The patent teaches how to add the numbers in the two columns to confirm the basic balance sheet equation, "assets equal liabilities plus owner's equity". This patent teaches only the most rudimentary balance sheet principle. It fails to relate any information about income statements, thereby completely omitting a fundamental component essential to the understanding of how accounting principles affect the financial condition of an enterprise.

Further, both of the Zegel and Schroeder patents present their topic in a dry fashion, being concerned with the technical manipulation of symbols to satisfy bookkeeping requirements. Neither presents a comprehensive overview that relates accounting to important and meaningful business issues.

SUMMARY OF THE INVENTION

What is required is a method of teaching accounting that conveys the fundamental concepts in a clear and simple manner. It would be advantageous for the method to be sufficiently efficient so that its educational objectives could be met within a relatively short time, for example, a one-day seminar. This would allow people who are working and otherwise lack the time to take a more extensive course to have the opportunity to acquire a functional amount of accounting knowledge. It would also be advantageous for the teaching method to be able to accept any capable individual as a student, even if the student has had no previous background in the area. This would make the method beneficial not just to entrepreneurs and managers, but also to non-managerial employees, some of whom might have limited educational backgrounds and/or language skills that would otherwise preclude them from participating in more conventional forums of instruction. This suggests that a graphical approach would be advantageous. Lastly, the method should preferably instill in its participants an enhanced understanding of the connection between accounting concepts and business issues, so that the participants will be able to make more knowledgeable and productive business decisions.

Accordingly, there is provided a method of teaching financial management of an enterprise, said method comprising:

(a) providing objects representing a balance sheet and an income statement, and also providing monetary markers, said balance sheet object and said income statement object each having a plurality of accounts;

(b) selecting a predetermined instruction to reflect a predetermined result;

(c) moving the monetary markers among at least one pair of said accounts to increase or decrease the monetary markers in each account for said at least one pair of accounts, in accordance with the selected instruction; and (d) visually depicting, by the resulting distribution of the monetary markers among the objects, a financial condition of said enterprise.

BRIEF DESCRIPTION OF THE DRAWINGS

Reference will now be made, by way of example only, to preferred embodiments of the invention as illustrated in the attached figures.

FIGS. 6(a) to (c) show a stylized balance sheet and income statement as in FIG. 1 representing a financial condition of an enterprise in response to a series of instructions as described in Example 1 below;

FIGS. 7(a) to (c) show a stylized balance sheet and income statement as in FIG. 1 representing a financial condition of an enterprise in response to a series of instructions as described in Example 2 below;

FIGS. 8(a) and (b) show a stylized balance sheet and income statement as in FIG. 1 representing a financial condition of an enterprise in response to a series of instructions as described in Example 3 below; and FIGS. 9(a) and (b) show a stylized balance sheet and income statement as in FIG. 1 representing a financial condition of an enterprise in response to a series of instructions as described in Example 4 below.

DETAILED DESCRIPTION OF THE PREFERRED EMBODIMENTS

The subject invention is a method of teaching financial management. The method may be used in a conventional in-person or classroom setting, i.e. where there is an instructor and course materials that are physically present with at least one student. The method may also be used in an automated or remote setting, i.e. where the student engages with the materials through a computer. The method in that instance may be driven by a local software program, or through a remote software program communicating with the student's computer through a remote communications means such as the Internet. Yet another possibility is a combination of the above where there is a live instructor, located remotely, that interacts with the student through a communications medium such as the Internet or telephone. The method of teaching according to the present invention is not affected by the choice of physical medium through which it is transmitted.

An element of the method involves providing objects representing the fundamental financial documents of a balance sheet and income statement, and also providing an object representing a source of monetary markers.

Figure 1:
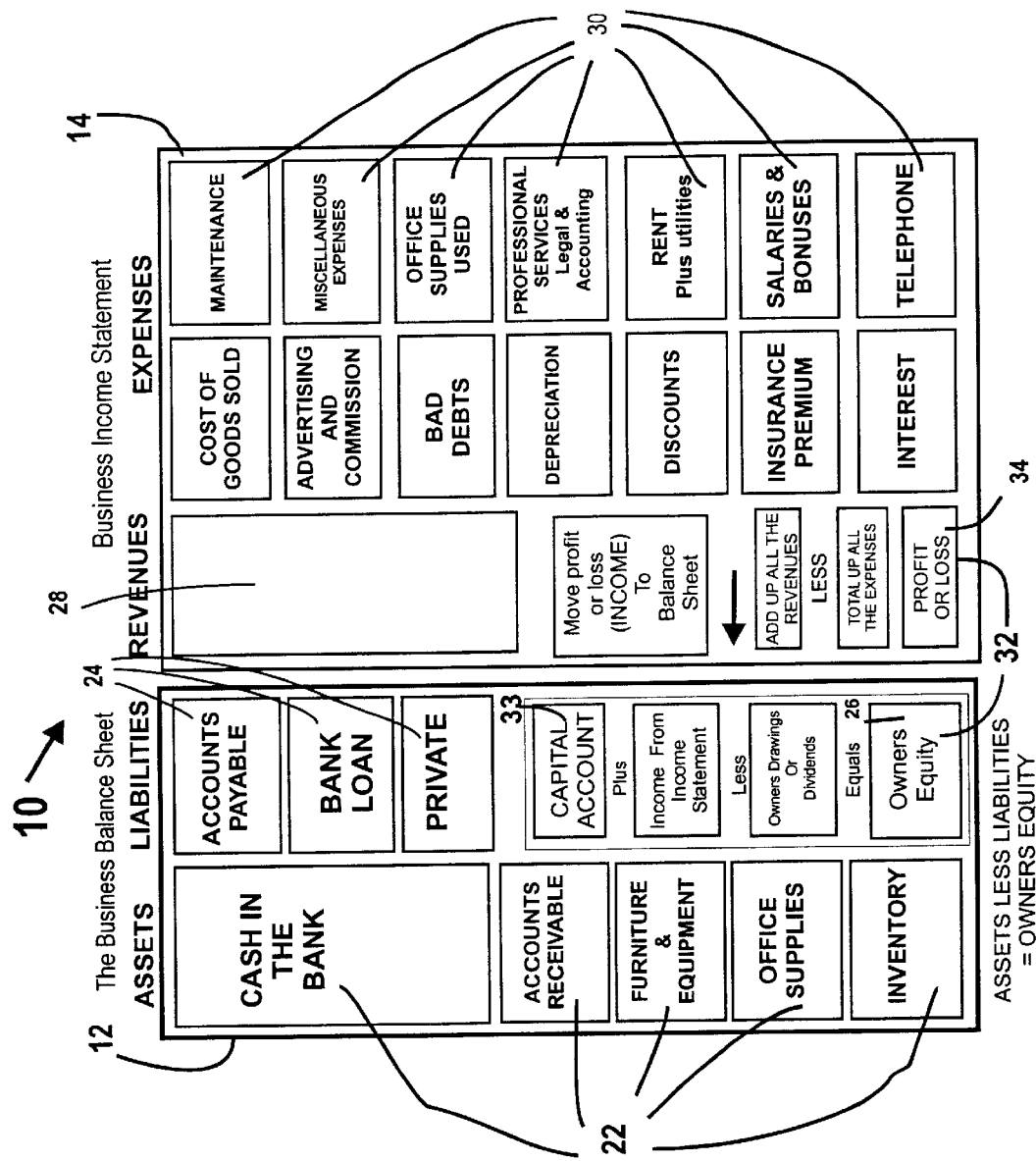
FIG. 1 is a view of a business balance sheet and income statement according to the present invention.

FIG. 1 shows an object 10 representing a balance sheet and an income statement according to the present invention. The object 10 may also be viewed as a composite of two distinct objects: a balance sheet 12 and an income statement 14. For the purposes of the present invention, it is of no concern whether the balance sheet and income statement are represented as one object or two objects, as long as a representation of each financial document is provided. The balance sheet 12 and income statement 14 represent an enterprise, which is a financial organization of concern to the student. In FIG. 1 the enterprise is a business. As will be shown below, the method of the present invention also comprehends other types of financial organizations, including the personal financial organization of an individual.

Figure 2:
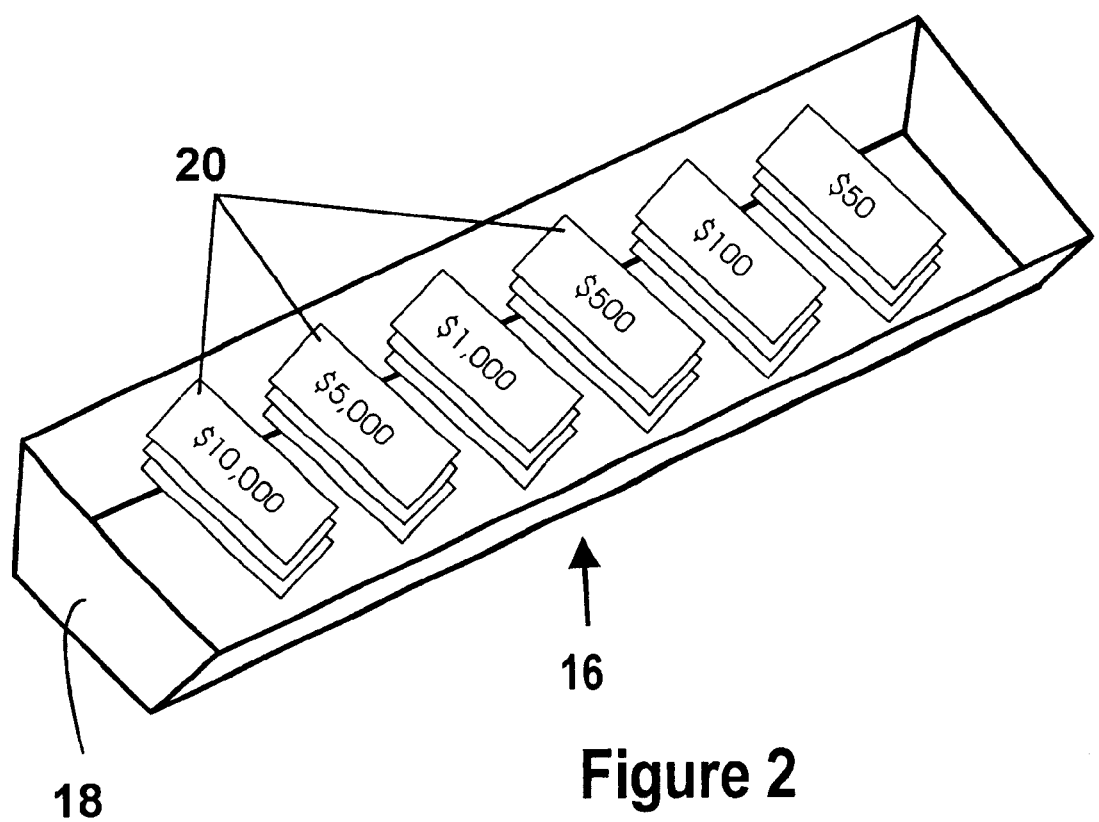
FIG. 2 is a perspective view of a source of monetary markers.

FIG. 2 shows a source of monetary markers, or source 16, consisting of a tray 18 and monetary markers 20. The source 16 represents a general economy, which means all aspects of the economy except for the enterprise, shown in FIG. 1. The tray 18 is a convenient receptacle to house the monetary markers 20, and that also, through its structure, contributes to the notion of the monetary markers 20 being located in a "source". For this reason, in a computerized embodiment of the invention it may be preferred to display an image of the tray 18 on the screen. In any event, it can be appreciated that tray 18 may be replaced by any other form of preferred container or even dispensed with entirely.

The monetary markers 20 are shown as a series of stacked units that may be likened to common paper currency. In FIG. 2 markers corresponding to the following denominations are shown: $10,000, $5,000, $1,000, $500, $100, and $50. This particular choice of denominations has been found to be adequate as it reasonably encompasses transactions that occur in the North American economy. It can be appreciated that the denominations selected can be varied as desired to reflect changing financial conditions in the general economy. Similarly, the denominations may also be varied to reflect the currencies of other countries. For example, where the method of the present invention is applied in Japan, denominations corresponding to yen and having much greater numerical value would be used. In this way, it can be appreciated that the method according to the present invention comprehends the use of monetary markers that are relevant and familiar to the student.

Returning to FIG. 1, it may be noted that the balance sheet 12 and income statement 14 each consist essentially of a grid with various boxes arranged in columns. The balance sheet 12 has two columns, representing the classic balance sheet concepts of "assets" and "liabilities", of which the latter also contains a section for "owner's equity". The boxes in each column represent accounting-type accounts, each box being imprinted with wording bearing the account title. The asset accounts shown in the preferred embodiment of FIG. 1, generally designated as 22, are "Cash", or "Cash in the Bank", "Accounts Receivable", "Furniture and Equipment", "Office Supplies", and "Inventory". Similarly, the liabilities accounts 24 are "Accounts Payable", "Bank Loan", and "Private Loan". Owner's Equity 26 has a single account, "Owner's Equity". The income statement 14 is similarly organized, with columns representing the notions of "revenues" and "expenses". There is one revenue account 28, called "revenues", that represents all sources of revenue for an enterprise. There are also fourteen expenses accounts 30 shown, arranged in two columns.

In the preferred embodiment the boxes representing the various accounts may be conveniently color-coded so that the different types of accounts can be easily distinguished by the student. Thus, for example, the boxes corresponding to asset accounts may be colored blue, those for liabilities accounts colored red, revenues accounts colored green, and expenses accounts colored yellow. It can be appreciated that a different selection of color choices may be made, or that no colors may be used at all, if desired.

It may also be noted that the objects in FIG. 1 include several instructional boxes 32 that do not represent specific accounts. These include for example the box "Capital Account" 33 in the balance sheet 12 and "Profit or Loss" 34 in the income statement 14. The instructional boxes 32 are present in the preferred embodiment to assist the student in implementing certain accounting procedures, as will be discussed further below. The instructional boxes 32 are helpful in the application of the method of the present invention, but they are not essential and may be removed from the objects 10 if preferred. It may be noted that in the preferred embodiment the instructional boxes 32 may be shown without background shading, to render them visibly distinct from the color-coded account boxes.

Figure 3A:
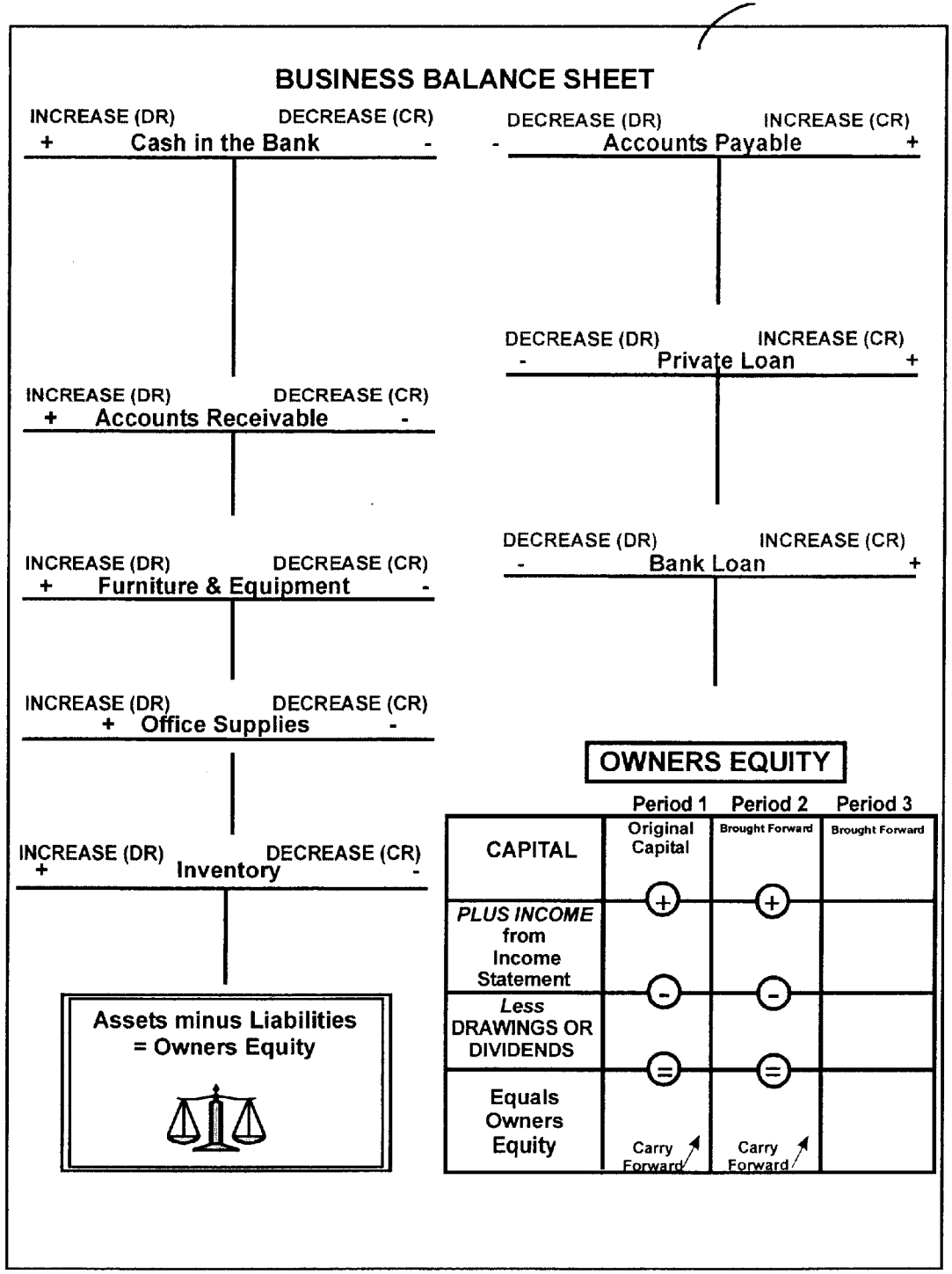
FIG. 3(a) is a view of a worksheet configured for a business balance sheet.
Figure 3B:
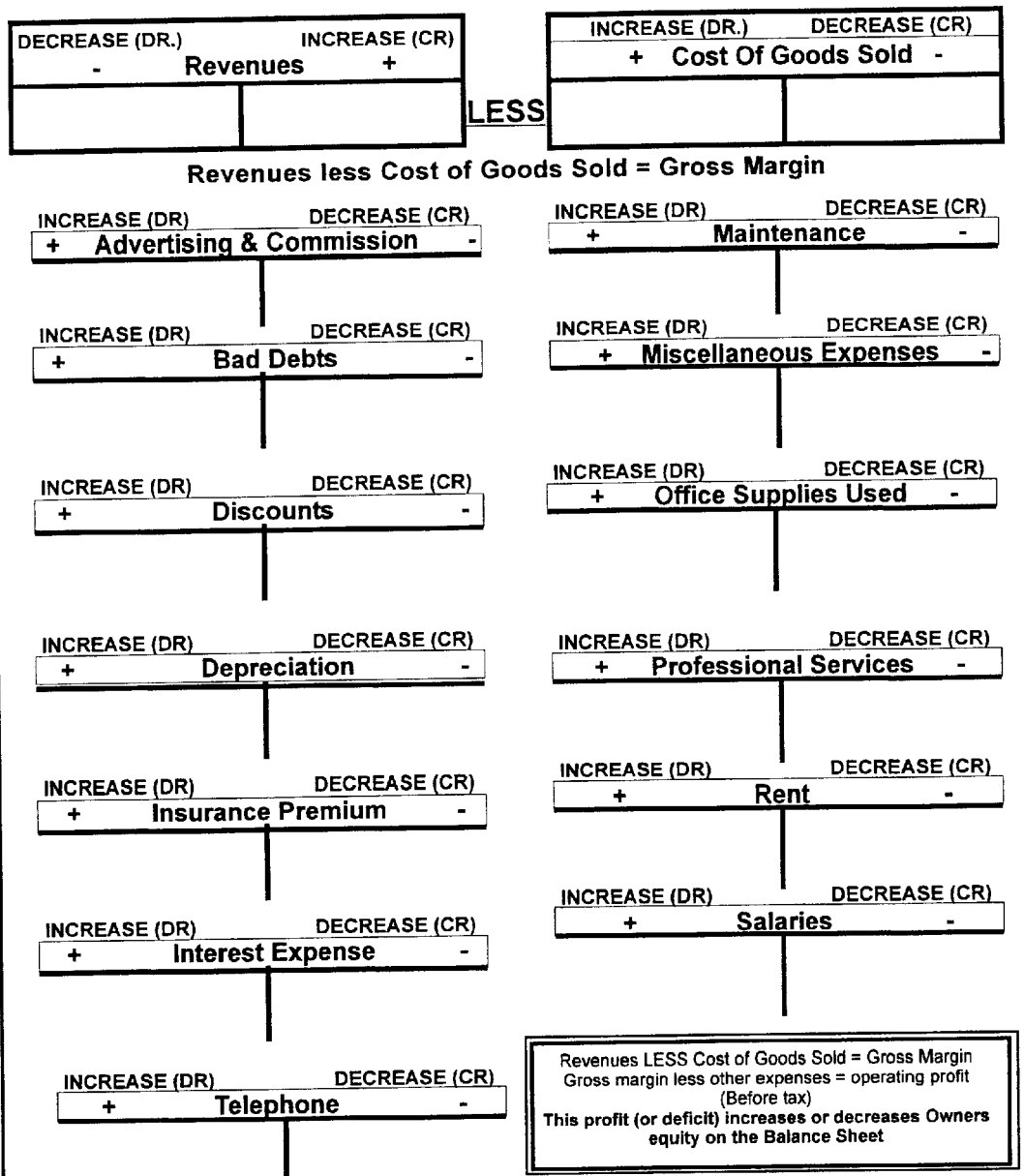
FIG. 3(b) is a view of a worksheet configured for a business income statement.

FIG. 3(a) shows a balance sheet worksheet 36 that corresponds to balance sheet 12, and FIG. 3(b) shows an income statement worksheet 38 that corresponds to the income statement 14. The worksheets are materials that may be provided as an additional aid in the course of applying the method of the present invention. Each worksheet contains a series of "T-accounts" representing an account from the corresponding financial document. Each T-account contains 2 columns, indicated with a "+" and "−" to represent increases and decreases respectively. The accounting concepts "Dr." and "Cr." for debit and credit are shown for accounting consistency. However, it may be noted that reference to the actual terms "debit" and "credit" is not necessary to the implementation of the method of the present invention, since the present invention is more concerned with teaching the principles of accounting and financial management than it is with any specific accounting or bookkeeping jargon. However, some of these terms may be optionally used from time to time as a reference for students with some prior accounting background. It may be noted that "Owner's Equity" is represented on the balance sheet worksheet 36 as a table, with rows reflecting capital, income, and drawings, and columns reflecting sequential periods in time.

Finally, it may also be noted that the worksheets contain various instructional boxes or messages to provide convenient reminders or assistance to the student.

Figure 4:
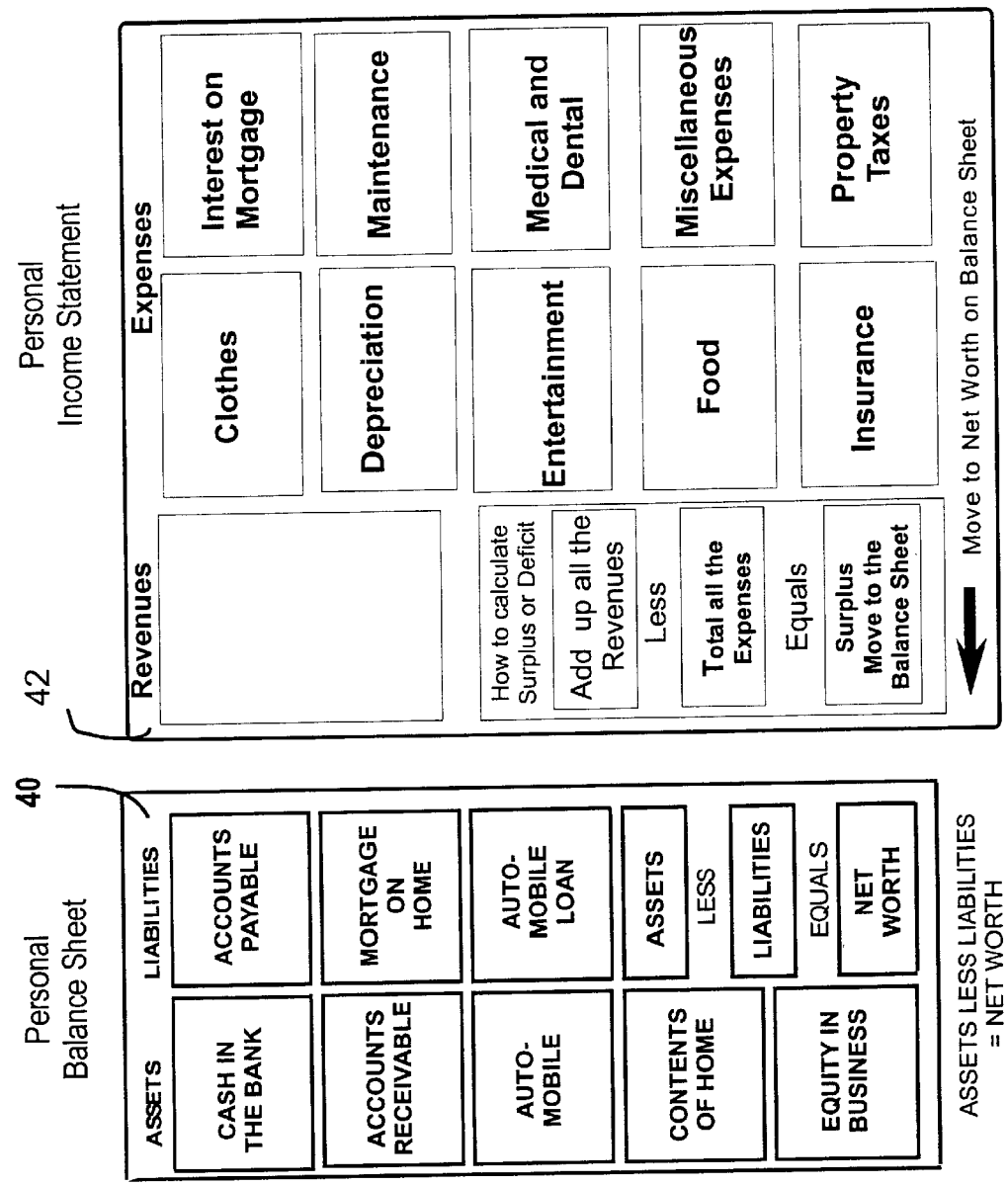
FIG. 4 is a view of a personal balance sheet and income statement according to the present invention.
Figure 5A:
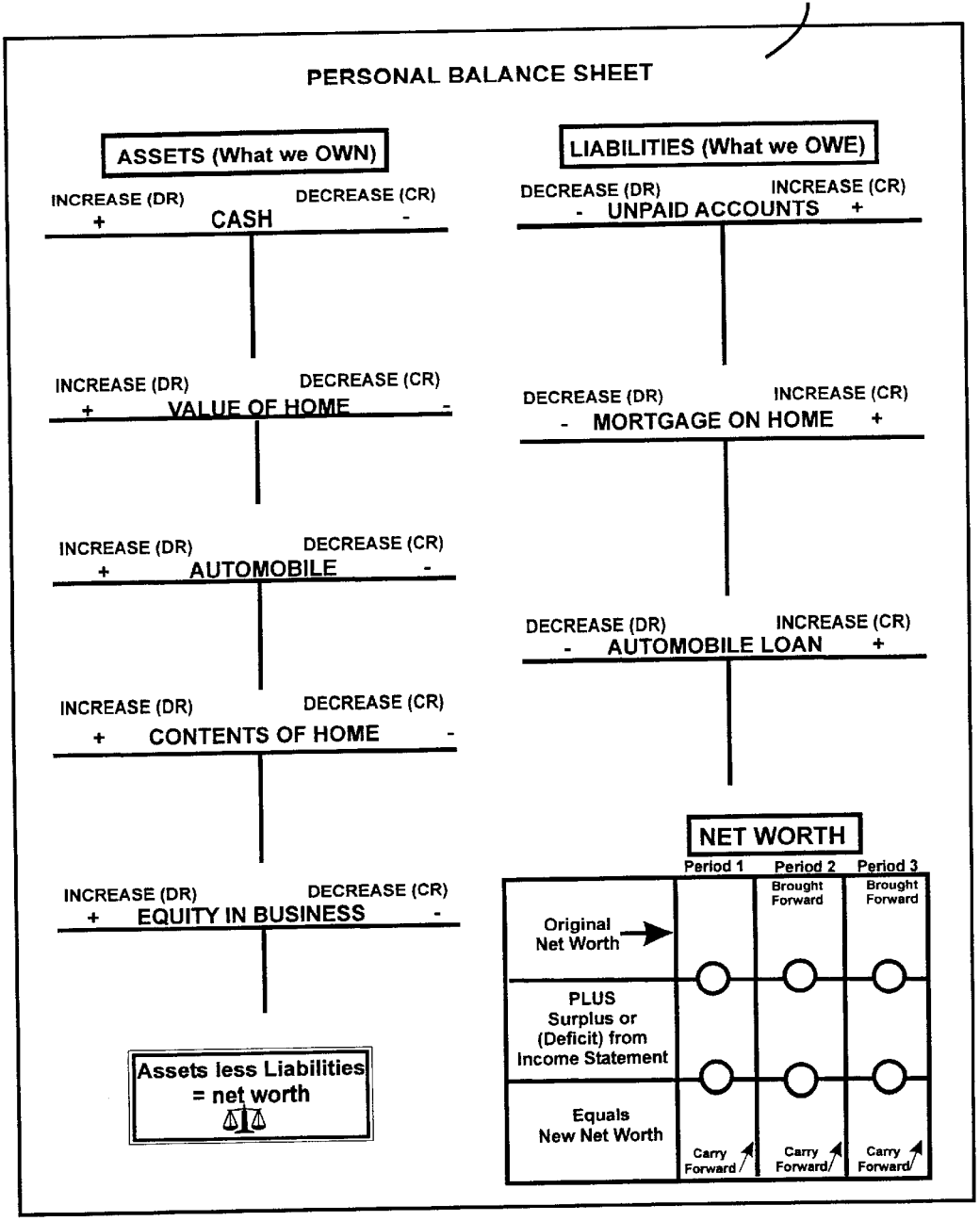
FIG. 5(a) is a view of a worksheet configured for a personal balance sheet.
Figure 5B:
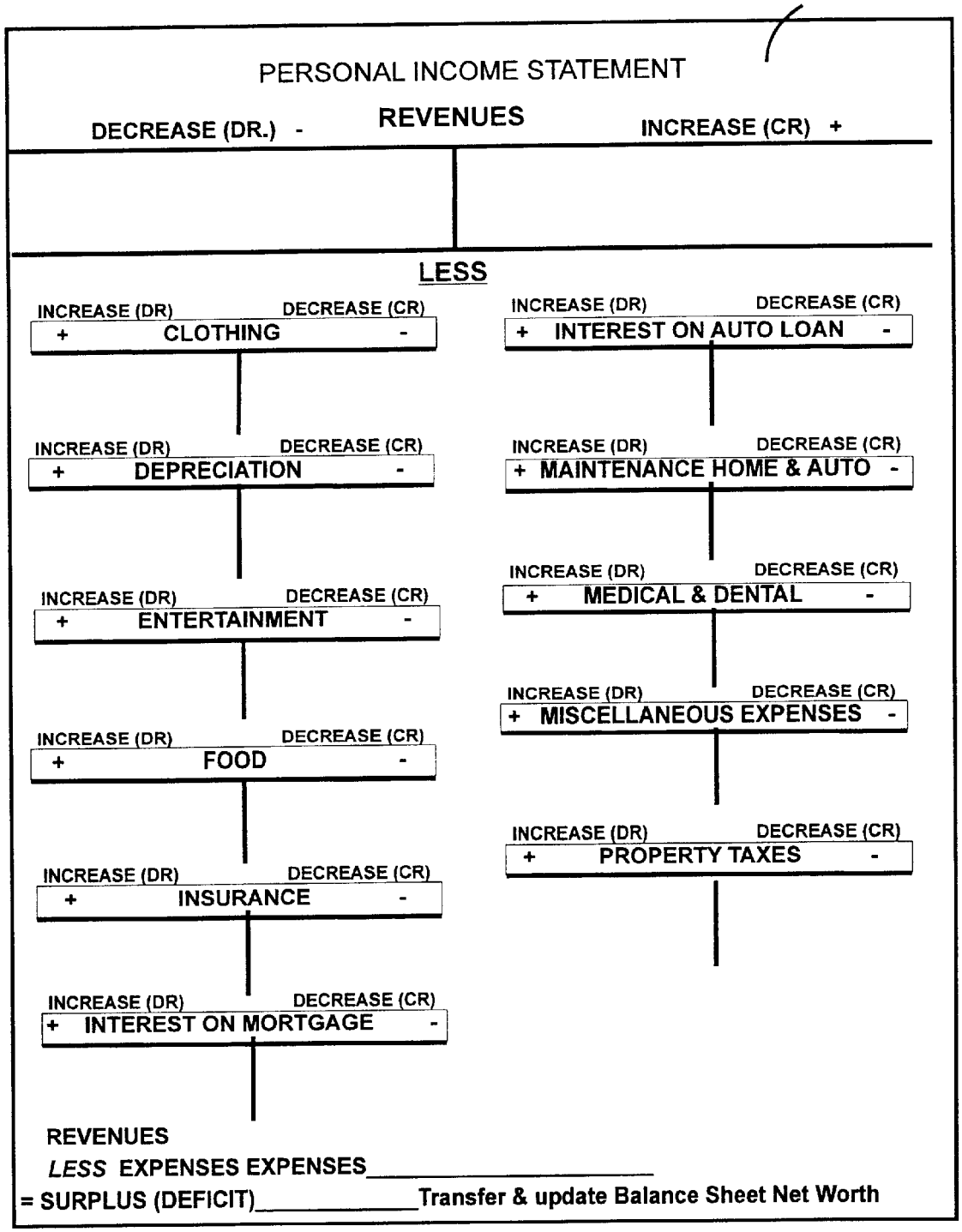
FIG. 5(b) is a view of a worksheet configured for a personal income statement.

The objects represented in FIGS. 1 and 3 have elements specifically configured for the financial management of an enterprise that is a business. FIG. 4 shows a balance sheet 40 and income statement 42 that is configured for personal financial management. FIGS. 5(a) and 5(b) show personal worksheets 44 and 46 that correspond with the personal balance sheet 40 and personal income statement 42. The personal financial documents shown in FIGS. 4–5 are similar to the business related documents shown in FIGS. 1 and 3, except that the names of the various accounts have been changed to reflect personal finance. In this way, it can be appreciated that the method of the present invention comprehends a variety of enterprises, such as businesses and personal finance as shown. Similarly it can be appreciated that other types of financial organizations such as non-profit, public, or government organizations, may also be accommodated by changing the names of the various accounts.

It can be appreciated that the accounts represented in the balance sheet and income statement objects, such as those shown in the preferred embodiments for a business enterprise in FIG. 1, are a representative subset of the accounts that are commonly used in many businesses. However, it is believed that using only a few accounts as shown is adequate for the educational purposes that are the object of the present invention. Moreover, it is believed that it is advantageous to limit the number of accounts because it enables the method of the present invention to focus on the underlying meaning of the various accounting transactions, without the distractions that may arise if a larger number of accounts were used. Further, limiting the number of accounts keeps the overall size of the balance sheet and income statement objects from becoming overly large. This has an advantage that the financial picture of the enterprise as a whole can be more easily viewed by the student, and is less intimidating as well. However, it can also be appreciated that the actual number of accounts to be displayed may be varied, and could be increased from the limited number shown in the preferred embodiments if desired.

It can also be appreciated that the particular accounts shown in the preferred embodiments are generally representative of the accounts used in a preponderance of businesses or personal finance management. For example, "cash", "accounts receivable", and "accounts payable" are accounts that are very widely used. However, it can be appreciated that the selection of accounts can also be modified as desired to better match the instructional needs of the situation. For example, the objects of FIG. 1 represent a business that is engaged in the sale of goods, as may be noted by the presence of "inventory" and "cost of goods" accounts. A service oriented business may not need these accounts, and may replace, for example, the inventory account with a goodwill account. Similarly, any of the accounts on the balance sheets, income statements, and associated worksheets may be replaced by accounts more suitable to the current type of business practiced by the students.

It can also be appreciated that the elements shown in FIGS. 1–5 may be configured for either in-person or remote instruction. As will be discussed below, the balance sheet and income statement objects are intended to accept the monetary markers for placement on the boxes that represent the various accounts. The monetary markers will be repeatedly placed and removed from the various boxes on these objects. The worksheets on the other hand are intended to accept sequential numerical data entry by the student.

These considerations suggest that when the method of the present invention is applied for in-person or classroom instruction, the boxes on the balance sheet and income statement objects should preferably be sized and shaped to conveniently accept the monetary markers. That is, the boxes should preferably at least match the monetary markers in size, so that the monetary markers will be less likely to spill over into adjacent boxes.

The balance sheet and income statement objects may be conveniently presented in the form of a flat board. Typically the board will have one side imprinted with the various accounts, and have a stiff cardboard backing. It is useful for the imprinting of the name of each account to be in duplicate or otherwise positioned so that the name of the account may be read even when monetary markers have been placed on it. There is often a deep impression at or about the middle so that the board can be folded for convenient storage when not in use. One board may be used to represent both the balance sheet and income statement, or alternatively each financial document may have its own board. Alternatively, instead of using a stiff board, the objects provided could also be adequately represented by simply printing them out on an oversized paper. An advantage of a board is that it may be re-used many times; however a simple print-out could always be re-printed when it is no longer fit for use. The worksheets may be conveniently printed out on ordinary paper, which can be written on easily, and disposed of after use.

In a computer-driven or remote mode of instruction, many of these considerations would be taken care of by computer software. For example, the balance sheet and income statement objects, monetary markers, and worksheets could all be images on a computer screen. The size of the balance sheet and income statement could be adjusted by the user, and may fit completely or partially on the screen depending on such factors as the user's preferences and the size of the screen itself. The physcial movement of monetary markers could be simulated by moving the image of monetary markers using a mouse-type pointing device. The monetary markers could be moved to the appropriate box, and even be symbolically "stacked" as well. Since this arrangement is software controlled, variation of accounts represented or any other factors desired by the user can be easily effected. Worksheet display and data entry could also be easily accommodated in the software environment.

The operation of the present invention may now be described. As noted, the present invention involves a method of teaching financial management of an enterprise. Financial management means an introduction to the basic concepts of accounting and their relationship to business issues. The invention is for providing business instruction to people with no previous accounting or business experience, and is also suitable to enhance understanding by people who have a background in financial management. The term enterprise in this context means any entity that functions as a financial organization in at least one aspect. As noted, this comprehends for-profit and non-profit businesses and government organizations and departments, as well as individuals and the like. The term general economy in this context means all aspects of the economy except for the enterprise. As such, it represents a source of money for the enterprise and a location to which money flows from the enterprise in the manner described below.

As described above, the method of the present invention involves providing objects representing a balance sheet 12 and income statement 14, and a source of monetary markers 16 from which individual monetary markers 20 may be extracted. The monetary markers 20 represent the general economy when they are in the tray 18 or, in any event, when they are not on the balance sheet 12 or income statement 14.

It can be appreciated that by providing objects representing both the balance sheet and income statement within a single view, the method of the present invention is able to provide a more comprehensive overview of the financial organization of an enterprise than prior approaches which only represented the balance sheet of an enterprise.

The method of the present invention next involves the selection of at least one instruction to represent a financial transaction. The selection would generally be made by an instructor or by a software program that is programmed to apply the method. Generally the basis for selection would be to illustrate a financial principle or idea commensurate with the level of financial knowledge of the student. For example, for a beginner a relatively simple instruction such as "sale of product for $100" might be selected. Conversely, an instruction for a more advanced student might be "dividend to another enterprise for $1,000".

After the instruction is selected, the instructor or software directs the student to simulate the effect of the financial transaction behind the instruction through movement of the monetary markers 20 among the balance sheet 12 and/or income statement 14 objects. The student will then consider the nature of the financial transaction and move the monetary markers 20 to satisfy this criteria. This may involve moving monetary markers 20 to and from the tray 18, i.e. the general economy, and/or may involve moving the monetary markers 20 to and from various boxes, representing specific accounts contained in the balance sheet 12 and income statement 14. The directing by the instructor or software program may also include a demonstration of how and where to move the monetary markers, or take the form of useful comments upon the student's movement of the monetary markers.

The step of moving the markers may also be understood as a simulation of the actual flow of money between the enterprise and the general economy. In effect, all transactions involve the general economy, even those that appear to be entirely internal to the enterprise. For example, the enterprise may choose to spend some of its cash to buy a needed computer. This step may be simulated by transferring the appropriate amount of monetary markers from cash to the equipment or computer asset account. However a more detailed breakdown of the transaction reveals that it has passed through the general economy. The enterprise would likely have written a cheque to the computer vendor. In that case, cash would transfer from the enterprise bank account to the vendor, i.e. the general economy. In exchange, a computer from the vendor, i.e. the economy again, would be delivered to the enterprise.

When distributing the monetary markers in accordance with the present invention it is not always necessary to simulate the intermediate steps involving the economy. However, it can be appreciated that in providing for an element that represents the general economy, and by distinguishing the economy from the enterprise, the method of the present invention provides a useful simulation that can assist the student in understanding the principles of financial management of an enterprise. For example, this approach makes it easier for the student to understand that a key objective of the enterprise is to have more value coming into the enterprise (from the economy) than leaves it (returns to the economy) over time, i.e. to build the owner's equity.

In addition, it can be appreciated that the step of physically moving the monetary markers, either directly or through simulation on a computer, imparts an improved appreciation of the effect of a transaction, since transferring actual money is an experience that all students can relate to. Further, by engaging the students' active involvement in moving money from one position to another to express accounting transactions, the students learn by doing.

Upon concluding movement of the monetary markers 20, there will be a new distribution of the monetary markers on the various boxes of the object 10. This distribution is a graphical representation of a financial condition of the enterprise. In effect, the distribution of the markers visually represents an abstract accounting or financial management concept. There are potentially an unlimited number of financial transactions that could be selected as instructions in the course of applying the method of the present invention. Each instruction will give rise to a particular movement of monetary markers, and result in a distribution of monetary markers on the object 10. Each such distribution in turn is a graphical representation of a financial condition of the enterprise.

The particular representation that results from application of the method of the present invention can then be evaluated by the student to derive insight into the effect of the financial transaction on the enterprise. Evaluation is the process whereby the student derives meaning from the visual representation of the financial condition. For example, the representation of the financial condition may show, through the monetary markers and the symbols on the balance sheet, that there is $1,000 in the cash account and $500 in the bank loan account. An evaluation of this condition will reveal that the enterprise has sufficient cash to pay off the bank loan. The same representation might show revenues of $2,000 and total expenses of $700. The student may evaluate this representation by calculating profit as revenues less expenses, in this case $2,000 less $700 is $1,300, and from that the value of owner's equity may be updated. Another common evaluation is to calculate a ratio, which is the relationship between any two accounts or groups of accounts. It may be noted that the instructional boxes 32 of the preferred embodiment are structured to be of assistance with this particular evaluation, since it is a classic calculation performed at every business period-end.

It can be appreciated that many representations of a financial condition can give rise to a large number and variety of evaluations. The complexity of evaluation that a given student may undertake may be determined at least in part by the guidance of the instructor, and will also often be related to the level of knowledge of the student. In general, the selection of instructions by the instructor or software will in many cases be made with a view to the type of evaluation that it is intended to elicit from the student.

It may also be noted that the financial transactions selected for representation by the instructor in many cases will require a series of instructions, rather than just one instruction, to be properly represented. The method of the present invention remains applicable in either case. That is, any one individual instruction will result in a representation of the financial condition resulting from the underlying transaction, and that representation may be evaluated. Alternatively, a series or group of instructions can be processed through the method of the present invention, and the student may choose to view only the representation resulting from the final instruction in the series as being worthy of review and further evaluation.

It can now be appreciated how the worksheets shown in FIGS. 3 and 5 function as aids to the student in performing evaluations of the financial condition of the enterprise. For each instruction that is selected, in addition to directing the movement of the monetary markers the student can also record an entry in the appropriate T-accounts of the worksheets. Where the student is proceeding through a series of transactions, the worksheets will at the conclusion of the series contain a convenient listing of all the transactions, which can be easily totalled. This is a useful adjunct to the representation of financial condition obtained by the distribution of monetary markers on the balance sheet and income statement objects. The representation shows a cumulative position only, and is totalled by counting the monetary markers, which can be slower than adding the numbers on the worksheets. In this way the worksheets can aid in the evaluation of the financial condition. Further, it can be appreciated that when the method of the present invention is implemented in an automated or computerized embodiment, the worksheets may also be automated to some degree.

In addition to the balance sheet and income statement, another financial document that is frequently used for financial management is the "statement of changes in financial position". The method of the present invention comprehends use of this additional object. Like the other documents, the statement of changes in financial position could be represented in terms of its various accounts, which would receive a distribution of monetary markers in response to selected instructions. As before, the distribution would represent a financial condition, and that representation could be evaluated. The method of the present invention can also comprehend yet further objects, such as a business plan object, a time management object, and other enterprise objects as well. In effect, any number of objects can be comprehended that would receive a distribution of monetary markers, be part of a representation of a financial condition, and give rise to further evaluation. Where there are objects for more than one enterprise, the representation and evaluation steps will provide insight into the financial management of their relationship between the objects.

It can therefore be appreciated how the method of the present invention teaches financial management. The method provides for an instruction or series of instructions representing at least one financial transaction, which is then converted by the student into an accounting oriented procedure, the result of which is a distinct representation of a particular financial condition. In effect, the invention references familiar business procedures into an accounting-based format, and uses physical examples (the monetary markers) to realize a physical presentation of the abstract concepts.

The physical presentation is a clear and simple graphical picture that can be readily viewed by the student and then evaluated for further financial detail. The graphical aspect of the invention also facilitates instruction of students who have limited or no background in financial management, or whose language skills may be weak.

The method of the present invention can be further illustrated by the following examples.

EXAMPLE 1

At the beginning of a period, a business commences with $1,000 in cash, $10,000 in furniture and equipment, $5,000 in inventory, owes $5,000 on a bank loan, and has $11,000 owner's equity. It then incurs the following transactions: makes a $1,000 sale from inventory (cost of goods is 50% of selling price), receives a $100 telephone bill, and experiences $100 depreciation of equipment.

FIG. 6 shows how the above series of financial transactions would be realized using the method of the present invention. FIG. 6(*a*) shows the representation of the starting point. In response to the selected instructions, the student would be directed to distribute monetary markers so that there is $1,000 in the cash account, $10,000 in the furniture & equipment account, $5,000 in the inventory account, $5,000 in the bank loan account, and $11,000 in owner's equity. Since this is a period beginning, the income statement 14 is empty, and the balance sheet 12 is in balance, with the assets column equaling the liabilities column in the amount of $16,000. It may be further noted that this starting point is itself a visual representation of the financial condition at the beginning of the period.

In response to the instruction of a $1,000 cash sale, the student will be directed to add $1,000 to each of cash and revenue accounts. Since the product sold cost the enterprise 50% of $1,000, or $500, the amount of $500 is reduced from inventory and added to the cost of goods sold expense.

In response to the instruction of a $100 telephone bill, the student will add $100 to accounts payable and $100 to telephone expense. The depreciation instruction results in reducing furniture and equipment by $100, to $9,900, and adding $100 to depreciation expense.

Figures 6A, 6B, 6C:
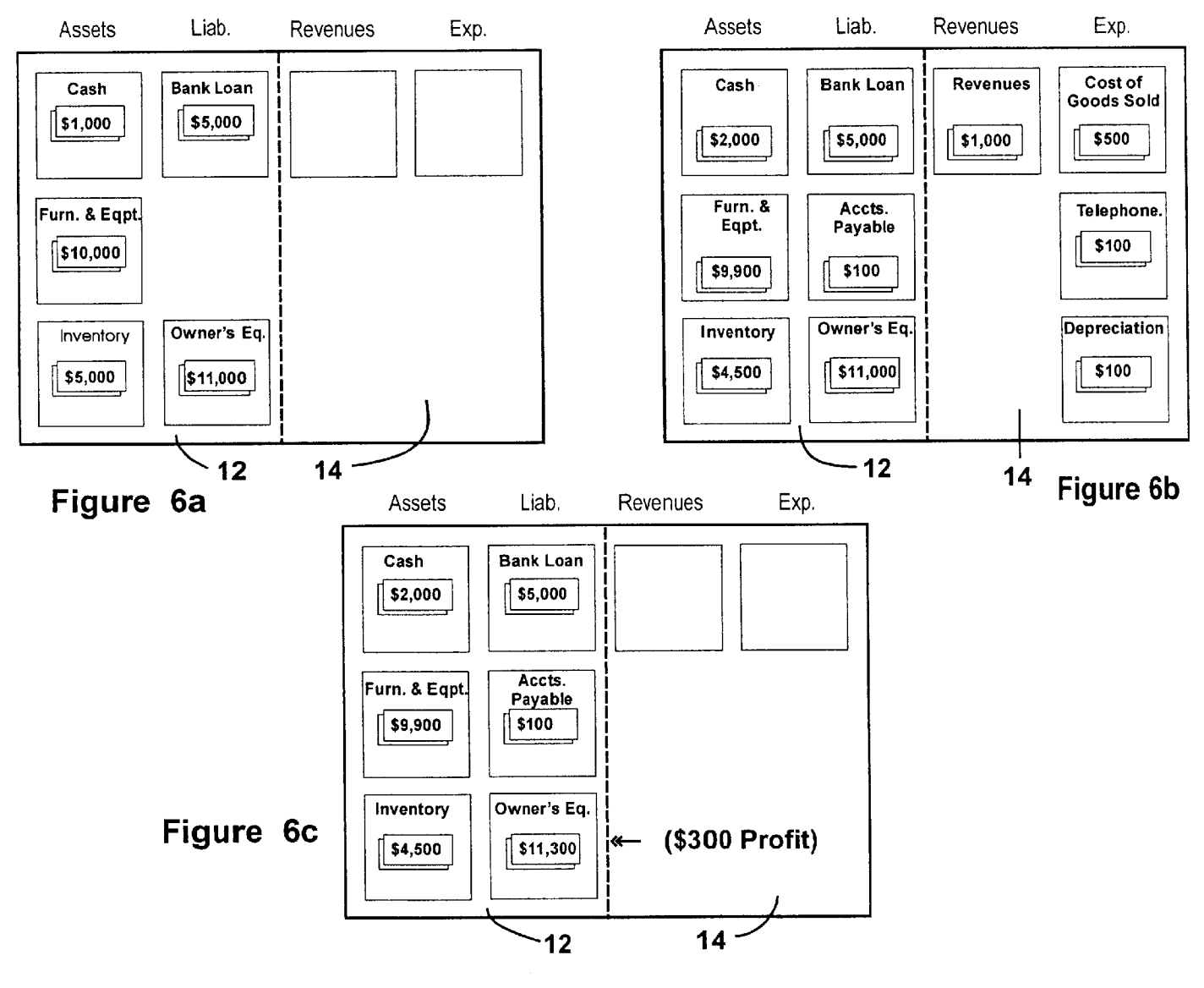

The result at the conclusion of the three instructions is indicated in FIG. 6(b). Again, the board as it appears is a visual representation of the financial condition of the enterprise as a result of the three instructions. This representation reveals at a glance that there have been sales and a number of expenses. The student may choose to evaluate this representation by, for example, engaging in the common period-end practice of calculating income by subtracting expenses from revenues and adding the result to owner's equity. This is shown in FIG. 6(c). In this case, revenues of $1,000 less total expenses of $700 results in a profit of $300. This is added to owner's equity, bringing its new total to $11,300. Further evaluation may consist of observing that there is $2,000 cash available, which can easily pay the $100 owing to accounts payable, and that there is some cash available for repayment of the bank loan. The inventory level of $4,500 may be meaningful to the enterprise as a figure that prompts a need to re-order from suppliers, or alternatively it may represent an ample supply. It may also be noted that the balance sheet is in balance, as it should at the end of a period, with the assets column equaling the liabilities column in the amount of $16,400.

It can be appreciated from the above example that the method of the present invention can provide training in such aspects of financial management as the relationship of the income statement to the balance sheet, the availability of cash in the enterprise, and also, through the treatment of the depreciation expense, non-cash financial flows in the enterprise.

EXAMPLE 2

In this example, the starting point is a business with no cash, inventory of $40,000, and equipment of $60,000. There is a $40,000 loan and owner's equity of $60,000. Upon distribution of the monetary markers, a visual representation of the enterprise is shown in FIG. 7(a).

In the next period, the enterprise sells 6,000 items at $10, with a cost of goods of $5 per unit. Expenses are $27,500, which are paid out of the cash received from sales. Depreciation is $2,500, and there is a loan repayment of $2,000. The visual representation of the result of this series of financial transactions is shown in FIG. 7(b). Evaluation of this result reveals that cash has increased from zero to $30,500. However, revenues equal expenses at $60,000, therefore there is no profit and owner's equity remains at $60,000. Therefore, in spite of all the sales activity, the enterprise has not really gained anything. Almost all of the cash will be needed to repurchase inventory to have goods to sell in the next period. The end-of-period representation is shown in FIG. 7(c). A conclusion that may be drawn from this evaluation is that the business' expenses are too high and should be reduced.

EXAMPLE 3

Continuing from the previous example, the enterprise seeks to generate volume by discounting the price of the product by 10%, to $9. The cost of goods remains the same, at $5 per unit. Assume that it sells the same number of units, i.e. 6,000, for revenue of $54,000. It purchases $20,000 inventory on account, and the other items remain the same, i.e. expenses of $27,500 (paid out of cash from sales), depreciation of $2,500, and loan repayment of $2,000.

Figures 8A, 8B:
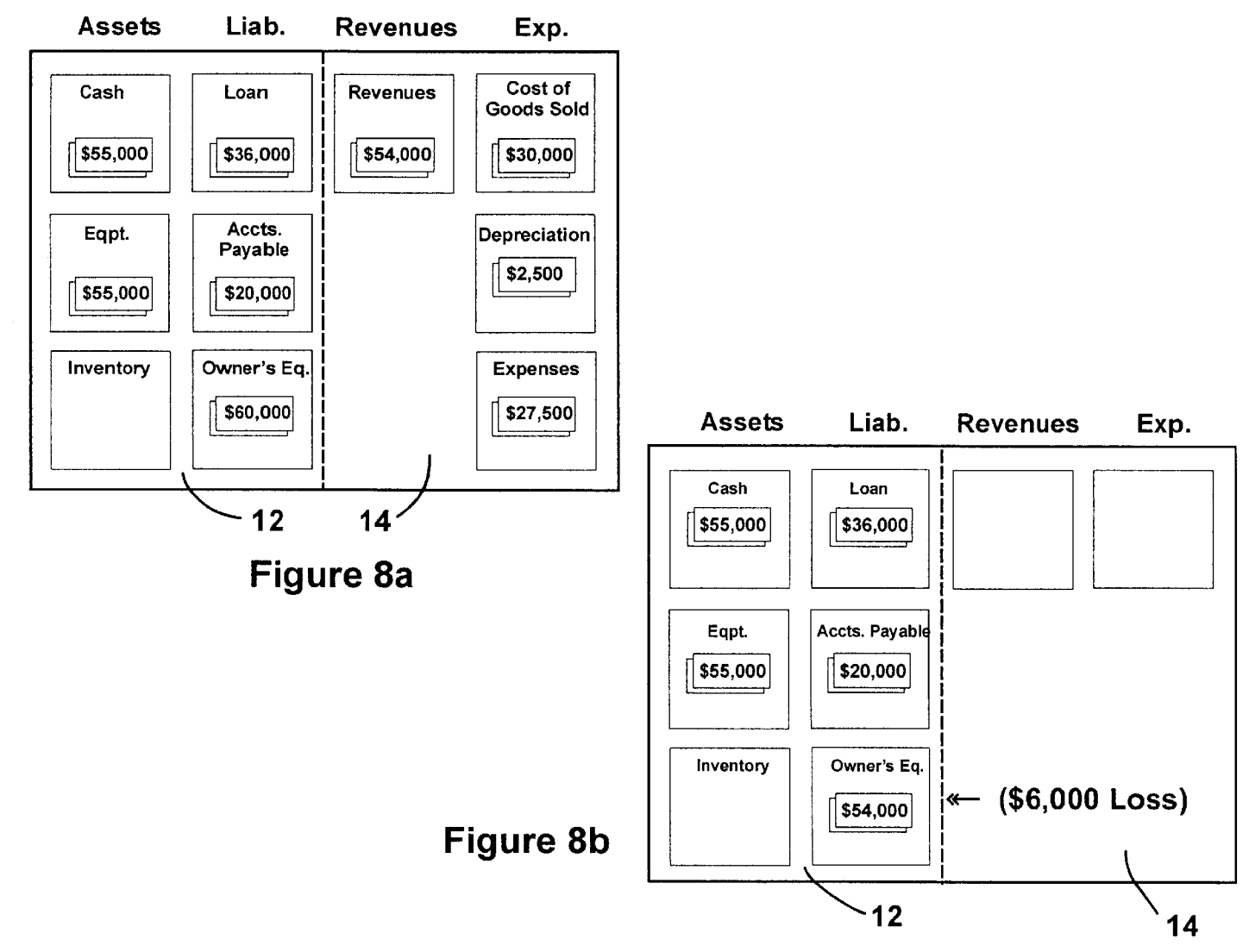

The visual representation of this series of transactions is shown in FIG. 8(a), and the end-of-period view is shown in FIG. 8(b). The key result is that the enterprise has lost $6,000, reducing owner's equity to $54,000. Again, while there is ample cash, it will be needed to pay accounts payable and replenish inventory. This example highlights the risks of discounting. If sales do not increase sufficiently to compensate for the reduced price, losses will occur which reduce equity and the financial strength of the enterprise.

EXAMPLE 4

Again continuing from the previous example, the enterprise now raises the price of product to $12.50, again with cost of goods at $5/unit. It pays off the $20,000 accounts payable with cash, and then orders $50,000 inventory, on account. Assume it again sells 6,000 units, which this time brings in $75,000 revenues. However, all sales have been made on credit, a policy which was adopted to overcome resistance to the higher selling price. The other items remain the same, i.e. expenses of $27,500, depreciation of $2,500, and loan repayment of $2,000.

The visual representation of this series of transactions is shown in FIG. 9(a), and the end-of-period view is shown in FIG. 9(b). In this case a healthy profit of $15,000 has been generated, which raises owner's equity to $69,000. However, because of the sales on credit, cash is perilously low. There is very little money to pay the large accounts payable or other on-going expenses. A conclusion from this example is that credit should not be granted too liberally, or the enterprise could get into trouble, notwithstanding that it has made a large profit.

It can now be appreciated how the method of the present invention teaches such principles of financial management as the relationship between pricing, cash, and profits in the enterprise. Additionally, it can be appreciated how the method imparts an enhanced understanding of the connection between accounting concepts and business issues. As a result, it may assist the students of the method to make more knowledgeable and productive business decisions.

It can now also be appreciated how the method of the present invention can provide relatively efficient training in financial management principles. Through careful selection of financial transactions, starting from the more basic and gradually extending to the more complex, a complete program of instruction can be provided in a relatively short time. The method of the present invention is able to accommodate both knowledgeable and novice groups, since the selection of instructions can be adjusted for each group as appropriate. Additionally, when applied to a group in a particular industry, the accounts used for the balance sheet and income statement can be modified as appropriate to be particularly relevant to that industry.

It will be appreciated by those skilled in the art that the foregoing description is in respect of preferred embodiments and that various alterations and modifications are possible within the broad scope of the appended claims without departing from the spirit of the invention. For example, where it is desired to impart technical accounting and bookkeeping skills, more technical accounting terminology and principles could be incorporated into the objects provided and instructions selected than in the examples provided in the present invention. Additionally, a broader range of business issues could also be imparted by the method of the present invention. Various other modifications will be apparent to those skilled in the art but are not described in any further detail herein.

I claim:

1. A method of teaching financial management of an enterprise, said method comprising:

(a) providing objects representing a balance sheet and an income statement, and also providing monetary markers, said balance sheet object and said income statement object each having a plurality of accounts;

(b) selecting a predetermined instruction to reflect a predetermined result;

(c) moving the monetary markers among at least one pair of said accounts to increase or decrease the monetary markers in each account for said at least one pair of accounts, in accordance with the selected instruction; and (d) visually depicting, by the resulting distribution of the monetary markers among the objects, a financial condition of said enterprise.

2. The method according to claim 1, further providing in step (a) an object representing a statement of changes in financial position.

3. The method according to claims 1 or 2, wherein steps (b), (c), and (d) of claim 1 are repeated at least one time to visually depict changes in the financial condition of said enterprise by reason of a series of said selected predetermined instructions.

4. The method according to claims 1 or 2, further including the step of:

(a) evaluating the distribution of the monetary markers among the objects to determine an effect of said instruction on said enterprise.

5. The method according to claim 4, wherein steps (b), (c), and (d) of claim 1 and the further step of claim 4 are repeated at least one time to evaluate the effect of a series of selected instructions on said enterprise.

6. The method according to claims 1 or 2, wherein the step of providing said objects further comprises providing said objects in person, as part of a tutorial or classroom session of instruction.

7. The method according to claim 6, wherein said objects being provided in person are in the form of at least one imprinted board.

8. The method according to claims 1 or 2, wherein the step of providing said objects further comprises providing said objects through remote communication means or through software.

9. The method according to claim 8, wherein said objects being provided through remote communication means or through software appear as images on a computer screen.

10. The method according to claim 4, wherein said income statement object has a revenue account and at least one expense account and said balance sheet object has an owner's equity account, and wherein said step of evaluating the distribution of the monetary markers includes subtracting the monetary markers distributed in said at least one expense account from the monetary markers distributed in said revenue account to calculate a net profit, and said step further includes adding to said owner's equity account an amount of monetary markers having a value equal to said calculated net profit, said method of teaching financial management teaching the accounting relationship between the balance sheet and the income statement of the enterprise.

11. The method according to claim 4, wherein said balance sheet object has a cash account and at least one liability account, and said step of evaluating the distribution of monetary markers includes comparing the monetary markers distributed in the cash account with the monetary markers distributed in said at least one liability account, said method of teaching financial management teaching the availability of cash in the enterprise.

12. The method according to claim 4, wherein said income statement object has a depreciation expense account and said balance sheet object has at least one asset account, and wherein said step of selecting a predetermined instruction includes selecting an instruction to depreciate said at least one asset by a fixed amount, and said step of moving the monetary markers includes increasing the value of monetary markers in said depreciation expense account by said fixed amount, and said step further includes reducing the value of monetary markers in said at least one asset account by said fixed amount, said method of teaching financial management teaching the accounting concept of depreciation.

13. The method according to claims 1 or 2, further including providing worksheets listing said accounts, said worksheets being configured to accept entries recording the increase or decrease in each account associated with each instruction, and to display successive entries in each account in a single view, wherein the step of moving the monetary markers is recorded with entries in said worksheets.

14. The method according to claim 4, further including providing software, wherein the step of evaluating the distribution of monetary markers includes visually depicting said monetary markers as images on a computer screen.

15. The method according to claim 1, wherein the step of moving the monetary markers includes increasing or decreasing an equal value of monetary markers in each account for said at least one pair of accounts.

* * * * *